(12) United States Patent
    Munjurulimana

(10) Patent No.: US 10,351,085 B2
(45) Date of Patent: Jul. 16, 2019

(54) ENERGY ABSORBING ASSEMBLY AND METHODS FOR MAKING AND USING THE SAME

(71) Applicant: SABIC Global Technologies B.V., Bergen op Zoom (NL)

(72) Inventor: Dinesh Munjurulimana, Bangalore (IN)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 1 day.

(21) Appl. No.: 15/579,417

(22) PCT Filed: Jun. 2, 2016

(86) PCT No.: PCT/IB2016/053248
    § 371 (c)(1),
    (2) Date: Dec. 4, 2017

(87) PCT Pub. No.: WO2016/193935
    PCT Pub. Date: Dec. 8, 2016

(65) Prior Publication Data
    US 2018/0141512 A1    May 24, 2018

(30) Foreign Application Priority Data
    Jun. 5, 2015 (IN) .......................... 1672/DEL/2015

(51) Int. Cl.
    *B60R 19/18*    (2006.01)
    *B60R 19/24*    (2006.01)
    *B60R 19/34*    (2006.01)

(52) U.S. Cl.
    CPC .............. *B60R 19/34* (2013.01); *B60R 19/18* (2013.01); *B60R 19/24* (2013.01);
    (Continued)

(58) Field of Classification Search
    CPC .......... B60R 19/18; B60R 19/24; B60R 19/34; B60R 2019/1806; B60R 2019/1833; B60R 2019/1846; B60R 2019/264
    (Continued)

(56) References Cited

U.S. PATENT DOCUMENTS

| 5,788,297 A | 8/1998 | Sugawara et al. |
| 6,099,055 A * | 8/2000 | Hirota ..................... B60R 19/18 |
| | | 293/120 |

(Continued)

FOREIGN PATENT DOCUMENTS

| DE | 202010003367 U1 | 7/2011 |
| EP | 2284045 A1 | 2/2011 |

(Continued)

OTHER PUBLICATIONS

International Search Report for International Application No. PCT/IB2016/053248; International Filing Date: Jun. 2, 2016; dated Oct. 27, 2016; 5 Pages.

(Continued)

*Primary Examiner* — Gregory A Blankenship
(74) *Attorney, Agent, or Firm* — Cantor Colburn LLP

(57) ABSTRACT

An energy absorbing assembly for attachment to a vehicle, comprising: a beam, wherein the beam comprises a curved portion contiguous with and oriented between a first end portion and a second end portion, wherein the curved portion comprises a front side and a back side; a first crash can extending from the first end portion of the beam, the first crash can including cavity formed by sides extending from a first attachment face, with a first protrusion projecting forward from the attachment face toward the front side of the beam, and the first crash can extending behind the back side of the beam at the first end portion; wherein the first protrusion extend from the first attachment face by an
(Continued)

amount that is greater than or equal to 110% of a distance that the first sides extend from the first attachment face.

20 Claims, 6 Drawing Sheets

(52) U.S. Cl.
CPC .............. *B60R 2019/1833* (2013.01); *B60R 2019/1846* (2013.01); *B60R 2019/1873* (2013.01)

(58) Field of Classification Search
USPC .................................................. 293/102, 120
See application file for complete search history.

(56) References Cited

U.S. PATENT DOCUMENTS

| | | | |
|---|---|---|---|
| 6,270,131 B1* | 8/2001 | Martinez ................ | B60R 19/34 188/371 |
| 6,938,936 B2* | 9/2005 | Mooijman .............. | B60R 19/18 293/120 |
| 7,044,515 B2* | 5/2006 | Mooijman .............. | B60R 19/18 293/102 |
| 8,439,411 B2* | 5/2013 | Cave ..................... | B29C 65/342 293/102 |
| 8,474,583 B2 | 7/2013 | Nagwanshi et al. | |
| 2001/0054826 A1* | 12/2001 | Hirota ..................... | B60R 19/18 293/102 |
| 2007/0182170 A1* | 8/2007 | Renault ................... | B60D 1/56 293/102 |
| 2009/0021031 A1 | 1/2009 | Enderich et al. | |
| 2009/0273197 A1* | 11/2009 | Muskos ................. | B60R 19/023 293/132 |
| 2012/0267908 A1* | 10/2012 | Kokubo ................. | B60R 19/34 293/133 |
| 2013/0154285 A1* | 6/2013 | Jeong ..................... | B60R 19/18 293/133 |
| 2014/0015265 A1* | 1/2014 | Ahn ....................... | B60R 19/34 293/133 |
| 2014/0203577 A1* | 7/2014 | Nagwanshi ............. | B60R 19/34 293/120 |
| 2014/0367982 A1* | 12/2014 | Kano ..................... | B60R 19/18 293/121 |
| 2015/0367795 A1* | 12/2015 | Lee ........................ | B60R 19/18 293/120 |
| 2016/0121827 A1* | 5/2016 | Yabu ...................... | B60R 19/18 293/120 |
| 2016/0144815 A1* | 5/2016 | Harris .................... | B60R 19/34 293/142 |
| 2017/0253202 A1* | 9/2017 | Holderried ............. | B60R 19/03 |
| 2017/0253204 A1* | 9/2017 | Venkat ................... | B60R 19/18 |
| 2018/0141512 A1* | 5/2018 | Munjurulimana ...... | B60R 19/18 |
| 2018/0215331 A1* | 8/2018 | Gumpina ................ | B60R 19/18 |
| 2018/0361967 A1* | 12/2018 | Ginja ..................... | B60R 19/24 |

FOREIGN PATENT DOCUMENTS

| | | |
|---|---|---|
| EP | 2380781 A1 | 10/2011 |
| WO | 03022640 A1 | 3/2003 |
| WO | 2010051865 A1 | 5/2010 |
| WO | 2012056349 A1 | 5/2012 |

OTHER PUBLICATIONS

Machine Translation of EP2380781; Date of Publication: Oct. 26, 2011; 10 Pages.
Written Opinion of the International Searching Authority for International Application No. PCT/IB2016/053248; International Filing Date: Jun. 2, 2016; dated Oct. 27, 2016; 5 Pages.

* cited by examiner

ENERGY ABSORBING ASSEMBLY AND METHODS FOR MAKING AND USING THE SAME

CROSS REFERENCE TO RELATED APPLICATIONS

This application is a 371 of International Application No. PCT/IB2016/053248, filed Jun. 2, 2016, which claims priority to Indian Application No. 1672/DEL/2015, filed Jun. 5, 2015 which are incorporated herein by reference in their entirety.

BACKGROUND

There is an increasing emphasis on reducing damage to vehicles in low-speed collisions. In the case of low-speed collisions, energy absorbing assemblies can be used in bumpers and can absorb collision energy to reduce vehicle damage.

Varying performance requirements for vehicles have been established by organizations such as the United States Department of Transportation National Highway Traffic Safety Administration (NHTSA), Insurance Institute for Highway Safety (IIHS), the Research Council for Automobile Repairs (RCAR), and the Economic Commission for Europe (ECE). Regulations governing the low-speed damageability requirements for automobiles across the globe are different. For example, in Europe and the Pacific region, vehicles have to meet ECE 42 and RCAR standards at both the front and rear of the vehicle. In the U.S., vehicles have to pass other deformable barrier impact tests such as those set by NHTSA and IIHS.

For an automobile manufacturer or a supplier, it is important to develop a cost-effective solution capable of meeting multiple requirements. Accordingly, assemblies that can meet safety standards and can be manufactured in a cost-effective manner are desired.

BRIEF DESCRIPTION

Disclosed herein are energy absorbing assemblies, articles including the assemblies, and methods of making and using the same.

Disclosed herein is an energy absorbing assembly for attachment to a vehicle, comprising: a beam comprising a first end portion and a second end portion, wherein the beam comprises a curved portion contiguous with and oriented between the first end portion and the second end portion, the curved portion being arced in a direction orthogonal to a lengthwise direction of the beam, wherein the curved portion comprises a front side and a back side; a first crash can extending from the first end portion of the beam, the first crash can including cavity formed by sides extending from a first attachment face, with a first protrusion projecting forward from the attachment face toward the front side of the beam, and the first crash can extending behind the back side of the beam at the first end portion; a second crash can extending from the second end portion of the beam, the second crash can including cavity formed by sides extending from a second attachment face, with a second protrusion projecting forward from the front side of the beam, and the second crash can extending behind the back side of the beam at the second end portion; wherein the first protrusion extend from the first attachment face by an amount that is greater than or equal to 110% of a distance that the first sides extend from the first attachment face; and wherein the second protrusion extend from the second attachment face by an amount that is greater than or equal to 110% of a distance that the second sides extend from the second attachment face.

Disclosed herein is a method of making an energy absorbing assembly, comprising: introducing molten thermoplastic material to a mold to in situ form the energy absorbing assembly comprising a beam comprising a first end and a second end, wherein the beam further comprises a curved portion contiguous with and oriented between the first end and the second end, the curved portion being arced in a direction orthogonal to a lengthwise direction of the beam, wherein the curved portion comprises a front side and a back side; a first crash can extending from the first end of the beam, the first crash can including a first protrusion projecting forward from the front side of the beam at the first end, and the first crash can extending behind the back side of the beam at the first end; a second crash can extending from the second end of the beam, the second crash can including a second protrusion projecting forward from the front side of the beam at the second end, and the second crash can extending behind the back side of the beam at the second end; and removing the energy absorbing assembly from the mold.

The above described and other features are exemplified by the following figures and detailed description.

BRIEF DESCRIPTION OF THE DRAWINGS

Referring now to the drawings, which are exemplary, not limiting, and wherein like elements are numbered alike in several figures.

DETAILED DESCRIPTION

Figure 1:
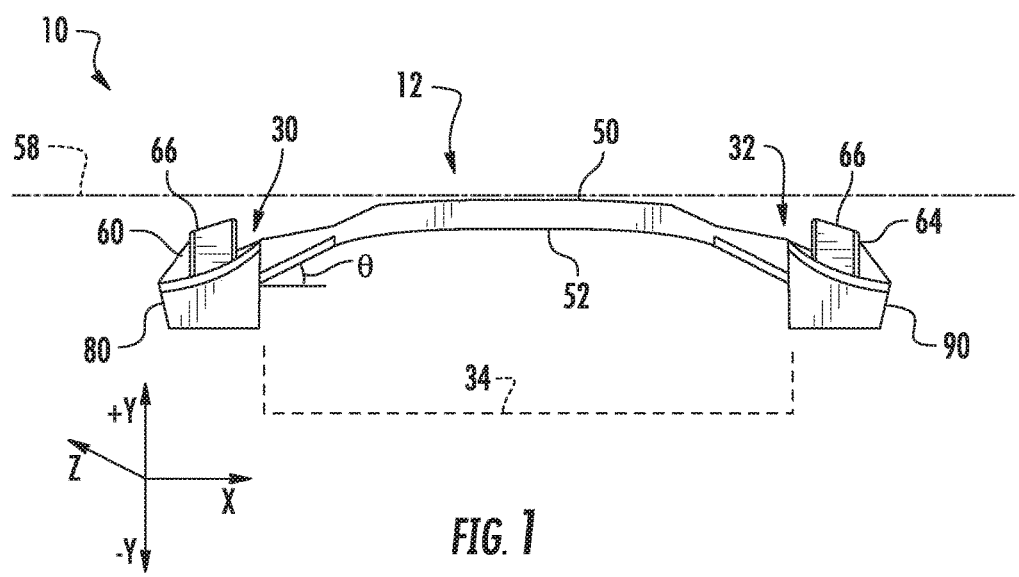
FIG. 1 illustrates a top view of the energy absorbing assembly.

An energy absorbing assembly including a crash can, a protrusion and a connecting beam can provide a light-weight energy absorbing system that can efficiently absorb impact energy associated with vehicle collisions with another vehicle, an object, etc. It can be expensive to repair vehicle components including the tailgate, engine components, bumper, or lights damaged during low or moderate speed collisions. There are many specifications a bumper assembly can meet, including regional safety specifications, national safety specifications and internal development specifications. These specifications can vary between locations (e.g., United States and Europe) where the vehicle is sold. Thus, it can be desirable for an energy absorbing assembly to meet most global bumper safety requirements. An energy absorbing assembly including a crash can, a protrusion and a connecting beam as described here can meet most global bumper safety requirements, e.g., ECE R 42 center pendulum tests and/or RCAR 10 degree 40% overlap 15 km/h impact tests. As used herein the RCAR impact tests are based upon RCAR Low-speed structural crash test protocol—Issue 2.2, July 2011; and the ECE R42 center pendulum tests are based upon ECE R 42 uniform provision concerning the approval of vehicles with regard to their front and rear protective devices—date of entry into force as an annex to the agreement 1 Jun. 1980.

The energy absorbing assembly can include a beam including a first end and a second end, where the beam includes a curved portion contiguous with and oriented between the first end and the second end. The curved portion can be arced in a direction orthogonal to a lengthwise direction of the beam. The angle (θ) of arc is dependent upon packing space, and desired energy absorption characteristics. For example, the angle (θ) can be 10 degrees (°) to 40°, e.g., 10° to 30° or 15° to 25°. The beam has a front side and a back side. The curve at the front side and the curve at the back side of the curved portion can be the same or different. The curved portion can be arced in a regular manner or can include sections with more or less arc than other sections. The curved portion can include flat or relatively flat (i.e., curve less than ±5 degrees) sections. The beam can include a flat or relatively flat portion in the center at the front side and back side, or a flat or relatively flat portion in the center of the front side or the back side. The beam can be curved along its length (x direction in FIG. 1, for example) such that the beam is convex (e.g., extending outward such that when attached to a vehicle, the beam extends away from the vehicle toward top wall 14 in FIG. 2, for example). The beam can have a center portion that has a smaller curve angle when viewed from the top than the portion at the first and second ends. The beam can have a center portion that matches the angle of a testing device. The beam can have a center portion that matches the angle of the ECE R 42 pendulum impact testing device.

The beam can be of any width from the front side to the back side when viewed from the top (e.g., in the y direction in FIG. 1), to provide the desired energy absorption characteristics of the energy absorbing assembly, and to meet the space requirements of the vehicle. The beam width can vary through the length of the beam, or the beam width can be the same through the length of the beam. The ends of the beam can be wider than the center of the beam. The width can be chosen to provide the desired fabrication methods such as injection molding. Typically the width can vary from 10 mm to 100 mm at the center of the beam, and can vary from 50 mm to 300 mm at the end of the beam. The mass of the beam can vary from 0.8 kilograms (Kg) to 4 Kg.

The beam includes a first crash can extending from the first end of the beam and a second crash can extending from the second end of the beam. Each crash can has a protrusion that projects from the rear of the can, forward from the front side of the can at each end. The protrusions can extend from the front side of the crash can a distance that is less than or equal to a center portion of the beam (as is illustrated by line 58 in FIG. 1). Although the protrusions can extend beyond the center portion, such a design is generally not employed for aesthetic reasons. The amount of the protrusion that extends forward from the front side of the beam at each end can be selected to provide the desired amount of energy absorption from an impact test, such as an offset impact test, or for other considerations.

Each crash can extends behind the back side of the beam at each end. The amount of the crash can that extends behind the back side of the beam at each end can be selected to allow the desired amount of energy absorption, the desired space between the beam and the vehicle, to allow the beam (namely the crash cans) to attach directly to the vehicle rails, and/or for other considerations.

The crash cans can be fabricated separately from the beam and joined by plastic welding or other suitable joining technique, or the crash cans and beam can be integral and fabricated with the beam as one piece. Integral refers to the fact that the components (i.e., crash can and beam) cannot be separated from one another without damage to one of the components. The first and second protrusions can be integral with the first and second crash cans, or each piece can be fabricated separately and joined by plastic welding or other suitable joining technique. The entire energy absorbing assembly can be integral and fabricated as one piece, e.g., such as by injection molding or thermoforming.

The energy absorbing assembly can be attached to a vehicle via the crash cans. The crash cans include an attachment portion for facilitating a fixed connection of the assembly to a vehicle body. The attachment portion includes an attachment face that acts as the connection area to the vehicle body. The connection between the energy absorbing assembly and a vehicle can be a mechanical attachment, (e.g., screws, bolts, and/or nuts), using attachment holes in the attachment face, or any other suitable joining technique. Each attachment portion of a crash can may align with a vehicle rail.

Although the crash cans and protrusions are shown as square or rectangular in shape in certain embodiments, it is contemplated that any shape crash can and/or crush box could be used. For example, a crash can and/or crush box could include a shape such as rounded (e.g., conical, circular, elliptical, and so forth), or polygonal (e.g., square, rectangular, elliptical, trapezoidal, and so forth), and combinations comprising at least one of the foregoing.

The beam can have one or more portions along the height (e.g., the z direction, see FIG. 1). The beam can have an upper portion, a middle portion and a bottom portion. Each portion can be separated by a wall. As an example, the beam can be formed from the following portions viewing from the top of the beam down: a top wall and a mid wall, forming the upper portion; two mid walls forming the middle portion; and a mid wall and bottom wall forming the bottom portion. The walls, portions and other components can be any thickness or width that provides the desired energy absorbing characteristics, fabrication characteristics, or other considerations. The beam can have more than one middle portion.

The beam can include one or more closed or open portions at the front side and one or more closed or open portions at the back side. In an example, the top wall has a solid front face, the bottom wall has a solid front face, and the mid wall has a solid back face, forming an alternating open-closed structure proceeding down the beam.

The top wall, mid wall and bottom wall can be connected using one or more ribs. Ribs can be disposed between the walls and can provide structural reinforcement (e.g., rigidity, torsional stiffness, and the like) to the beam, which in turn can reduce deflection of the energy absorption assembly during a vehicle collision. The ribs can be the depth of the walls to which the ribs are connected. The ribs can be straight or curved, or any other suitable shape. Ribs can extend between the walls across the length of the beam. Ribs disposed between the top wall and a mid wall, between two mid walls, and between a mid wall and the bottom wall, and can be substantially parallel to each other (e.g., nearly 180 degrees apart from one another), and orthogonal to the walls. The ribs can be configured to be aligned between at least one of the upper portion, the middle portion, and the bottom portion, or the ribs can be configured to be offset from each other in the upper portion, middle portion and/or bottom portion (e.g., in a staggered arrangement). The ribs in the upper portion and the bottom portion can be aligned with each other or offset from each other. The ribs can form a space between the walls. This space can be of varying size. The size can provide controlled and efficient energy absorption. In an embodiment, the upper portion, bottom portion and middle portion can each independently include more than one row of ribs. For example, the upper portion, bottom portion and middle portion can each independently include greater than or equal to two rows of ribs; greater than or equal to three rows of ribs; greater than or equal to four rows of ribs; and greater than or equal to five rows or ribs. The ribs can be any shape that will provide the desired stiffness to the energy absorbing assembly and allow it to absorb energy and protect the vehicle components located behind the energy absorbing assembly from damage. Typically distance between each rib can vary from 10 mm to 40 mm. The thickness of the ribs can vary from 1.5 mm to 6 mm.

The beam and crash cans can further comprise horizontal flange(s) that extend between the beam and the crash cans. For example, the beam can be connected to the crash cans using a rear horizontal flange. The crash can and beam end can include a front horizontal flange. The rear and front horizontal flange can each be a uniform depth, or the depth can vary to provide the desired support or other characteristics. The rear horizontal flange can be any desired thickness to allow the desired connection and/or support between the beam and crash can(s). The front horizontal flange can be any desired thickness to allow for the desired support of the crash can or to provide other desired characteristics, for example. These flanges are provided to have a robust connection between the beam and the crash can. It is an integral piece of the energy absorbing assembly. Typical thickness of the flange can vary from 1.2 mm to 3.5 mm, and the height of the flange can vary from 5 mm to 30 mm. It can either extend the complete length of the beam or it can cover 10 to 25% of the width of the energy absorbing assembly. The flange is not a mandatory part of the energy absorbing assembly.

The cross-sectional shape of a crash can (perpendicular to the length of the beam) can be any shape. The crash can may comprise a cavity formed by the attachment face and sides extending from the attachment face, and the protrusion which is located in the cavity, extending away from the attachment face past the sides.

The protrusions can be formed by a plurality of walled channels. The channels can have a variety of shapes, such as a square, rectangle, circle, or other shape, such as a hexagonal shape. The protrusions extend away from the attachment face, in the same direction as the sides. The length of the protrusions is greater than or equal to 125% of the side height, specifically, greater than or equal to 150% of the side height, and even greater than or equal to 200% of the side height. For example, if the sides have a height of 10 mm, then the protrusions can have a length of greater than or equal to 12.5 mm, specifically, greater than or equal to 15 mm, and even greater than or equal to 20 mm.

Extending between the protrusions can and the attachment face and/or the sides can be one or more supporting ribs. Optionally, there can be one or more supporting ribs at each side of the protrusion. There can be different numbers of supporting ribs between each side of the crash can and protrusion. The supporting ribs do not need to be the same size or shape. The amount, number, and thickness of these supporting ribs is a balance between performance an enabling access to the attachment face for attachment to/from a vehicle. The side of the crash can and protrusion farthest from the end of the beam can have one or more than one supporting ribs.

Figure 12:
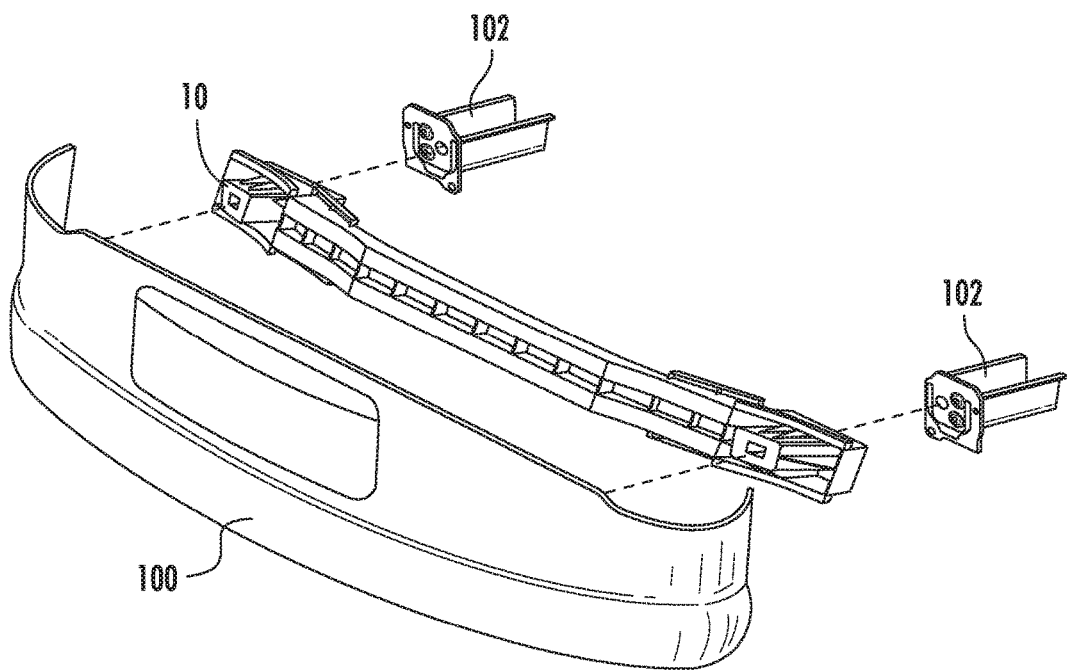
FIG. 12 is a perspective view of a portion of a vehicle, illustrating an energy absorbing system, fascia, and rails.

The front surface of the protrusions can each form an angle that matches the angle of a testing device. For example, the front surface of the first protrusion and the front surface of the second protrusion can each form an angle that matches the radius of an RCAR bumper barrier testing device. For example, the front surface of each protrusion can match the angle of the RCAR 10 degree 40% overlap bumper barrier testing device. The front surface of the protrusions does not need to form a solid surface, but can be open channels, closed channels or a combination thereof. The channels in the protrusions are open on at least one end, e.g., if the crash box is formed via injection molding. The front surface of the protrusions can have a profile that is flat or substantially flat (i.e., ±5 degrees from flat), or the front surface can have one or more indented or can be angled, wherein the angle ($\alpha$) is designed to conform to the shape of a fascia (see fascia 100, FIG. 12) that will be located over the assembly in a vehicle. Generally, the angle is up to 20°, specifically up to 15°, e.g., 5° to 20°. (See FIG. 7)

The energy absorbing assembly can be injection molded or formed with any other suitable manufacturing technique, such as extrusion, thermoforming, blow molding, and combinations comprising at least one of the foregoing.

The energy absorbing assembly can comprise any polymeric material or combination of polymeric materials that can be formed into the desired shape and provide the desired properties. Exemplary materials include polymeric materials as well as combinations of polymeric materials with elastomeric materials, and/or thermoset materials. In one embodiment, the polymeric materials comprise thermoplastic materials. Possible polymeric materials include polybutylene terephthalate (PBT); acrylonitrile-butadiene-styrene (ABS); polycarbonate (LEXAN™ and LEXAN™ EXL resins, commercially available from SABIC's Innovative Plastics business); polyethylene terephthalate (PET); polycarbonate/PBT blends; polycarbonate/ABS blends; copolycarbonate-polyesters; acrylic-styrene-acrylonitrile (ASA); acrylonitrile-(ethylene-polypropylene diamine modified)-styrene (AES); phenylene ether resins; blends of polyphenylene ether/polyamide (NORYL GTX™ resins, commercially available from SABIC's Innovative Plastics business); blends of polycarbonate/PET/PBT; PBT and impact modifier (XENOY™ resins, commercially available from SABIC's Innovative Plastics business); polyamides; phenylene sulfide resins; polyvinyl chloride PVC; high impact polystyrene (HIPS); low/high density polyethylene (L/HDPE); polypropylene (PP); expanded polypropylene (EPP); polyethylene and fiber composites; polypropylene and fiber composites (AZDEL Superlite™ sheets, commercially available from Azdel, Inc.); long fiber reinforced thermoplastics (VERTON™ resins, commercially available from SABIC's Innovative Plastics business) thermoplastic olefins (TPO), and carbon fiber reinforced polymeric composites (CFRP), as well as combinations comprising at least one of the foregoing.

An exemplary filled resin is STAMAX™ resin, which is a long glass fiber filled polypropylene resin also commercially available from SABIC's Innovative Plastics business. Some possible reinforcing materials include fibers, such as glass, carbon, and so forth, as well as combinations comprising at least one of the foregoing; e.g., long glass fibers and/or long carbon fiber reinforced resins. For example, carbon fiber reinforced polymeric composites can be utilized to form the energy absorbing assembly. Carbon fiber reinforced polymeric composites can be used as a coating (e.g., skin) on the energy absorbing assembly or portions thereof to provide the desired structural integrity to the energy absorbing assembly. The energy absorbing assembly can be formed from combinations comprising at least one of any of the above-described materials. For example, in some embodiments, the same material can be used to make each component of the energy absorbing assembly (e.g. the crash cans, beam, ribs and/or protrusions). In other embodiments, different materials can be used to make the various components of the energy absorbing assembly (e.g., one material can be used to make the crash cans and a different material can be used to make the ribs and a different or the same material can be used to make the protrusions). It is contemplated that any combination of materials can be used to, e.g., enhance crush characteristics, reduce damageability, etc.

Turning now to the figures, FIG. 1 illustrates a top view of energy absorbing assembly 10. The energy absorbing assembly 10 can have a beam 12 including a first end 30 and a second end 32. Beam 12 can have a curved portion 34 contiguous with and oriented between the first end 30 and the second end 32. Curved portion 34 can have a front side 50 and a back side 52. Curved portion 34 can be arced in a direction orthogonal to a lengthwise direction of the beam, where a lengthwise direction is shown in FIG. 1 as the x direction. In other words, beam 12 can be arced in the +y direction where front side 50 is positioned forward of back side 52, as shown in FIG. 1. Beam 12 can include a first crash can 80 extending from the first end 30 of beam 12. First crash can 80 can have a first protrusion 60 that can project forward from the front side 50 of curved portion 34 at the first end 30. First crash can 80 can extend behind the back side 52 of curved portion 34 at the first end 30. Beam 12 can include a second crash can 90 extending from the second end 32 of beam 12. Second crash can 90 can have a second protrusion 64 that can project forward from the front side 50 of curved portion 34 at the second end 32. Second crash can 90 can extend behind the back side 52 of curved portion 34 at the second end 32. First protrusion 60 and second protrusion 64 each have a front surface 66.

Figure 2:
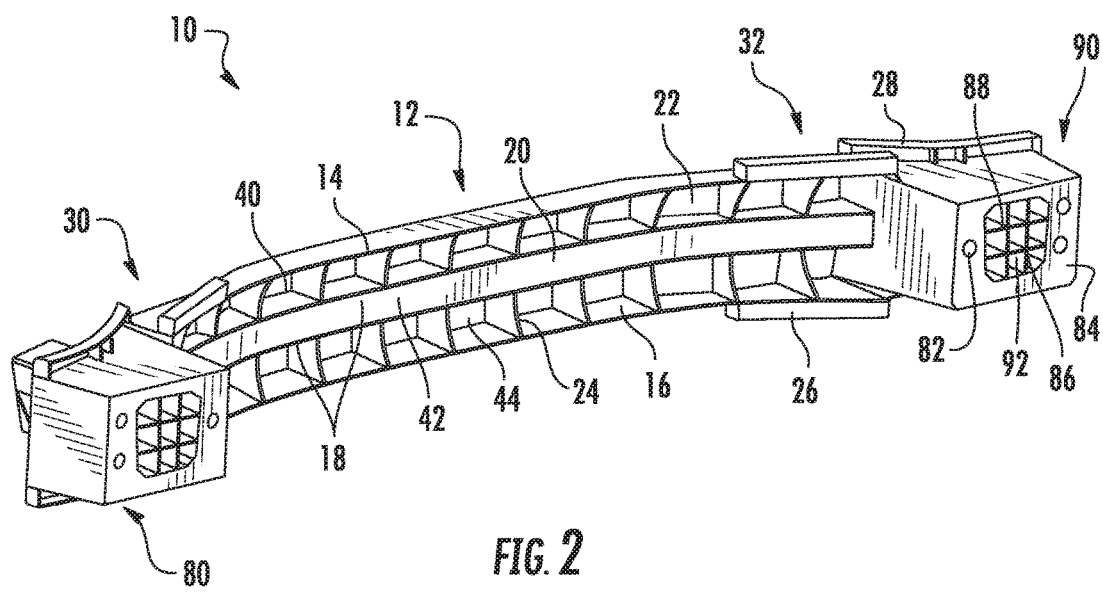
FIG. 2 illustrates a rear view of the energy absorbing assembly.
Figure 10:
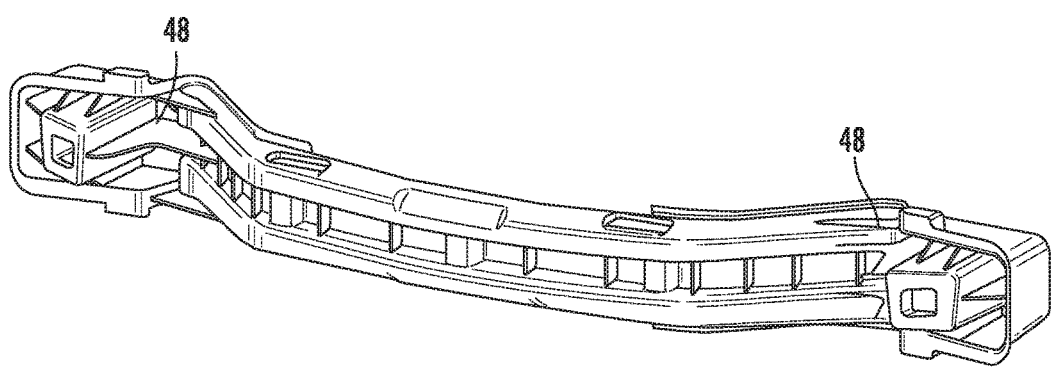
FIG. 10 illustrates a rear perspective view of an integral energy absorbing assembly with protrusions in the crash cans.

FIG. 2 illustrates a rear view of energy absorbing assembly 10. Beam 12 can have a first end 30 and a second end 32. Beam 12 can have a top wall 14, a bottom wall 16 and one or more mid walls 18. In FIG. 2, two mid walls 18 are shown. Beam 12 can have a back face 20 and front face 22. Front face 22 and back face 20 can be connected through mid walls 18 and ribs 24. Beam 12 can have an upper portion 40, a middle portion 42 and a bottom portion 44. Optionally, the upper and bottom portions can form channels open to the back face 20 but closed to the front face 22, while the middle portion 42 can form a channel that is open to the front face 22 but closed to the back face 20. Optionally, the upper and bottom portions can form channels closed to the back face 20 but open to the front face 22, while the middle portion 42 can form a channel that is closed to the front face 22 but open to the back face 20. (See FIG. 10) In either embodiment, the upper portion, middle portion, and bottom portion can comprise a plurality of ribs.

Beam 12 can have a rear horizontal flange 26 and a front horizontal flange 28. Beam 12 can have a first crash can 80 attached to first end 30 and second crash can 90 attached to second end 32. First crash can 80 and second crash can 90 can have attachment face 84 with one or more attachment holes 82. Optionally, one or more of the attachment holes 82 can comprise a grommet 94 located therein, e.g., a metal grommet. The grommet 94 can provide further structural integrity to the attachment between the beam and a vehicle (e.g., the rails 102 of a vehicle (see FIG. 12)). The First crash can 80 and second crash can 90 can have a honeycomb structure 92, where one or more channels 86 are connected by one or more walls 88.

Figure 3:
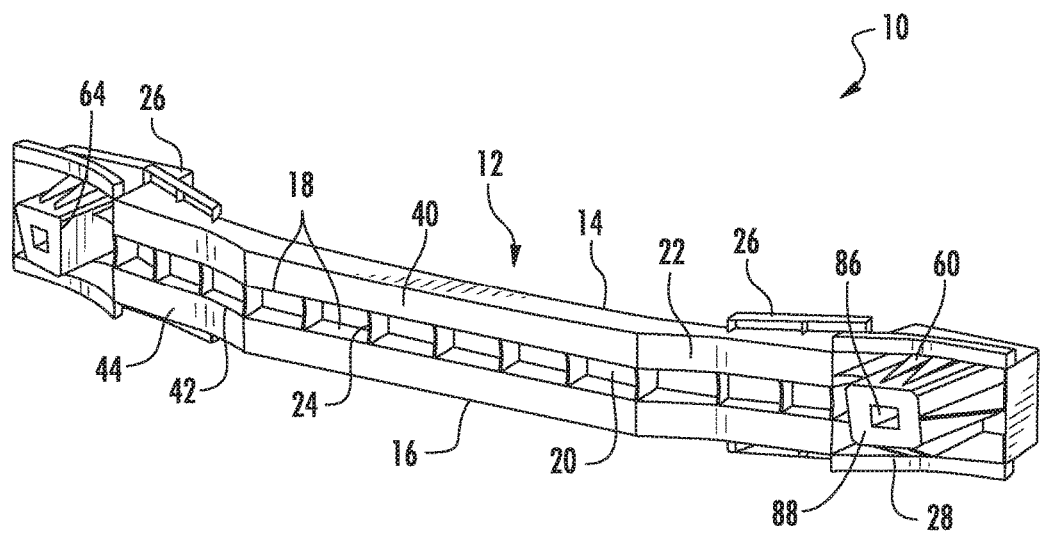
FIG. 3 illustrates a front view of the energy absorbing assembly.

FIG. 3 illustrates a front view of the energy absorbing assembly 10. Beam 12 can have a top wall 14, a bottom wall 16 and one or more mid walls 18. In FIG. 3, two mid walls 18 are shown. Beam 12 can have a back face 20 and front face 22. Front face 22 and back face 20 are connected through mid walls 18 and ribs 24. Beam 12 can have an upper portion 40, a middle portion 42 and a bottom portion 44. Beam 12 can have a rear horizontal flange 26 and a front horizontal flange 28. Beam 12 can have a first protrusion 60 and second protrusion 64. First protrusion 60 and second protrusion 64 can have channel 86 surrounded by walls 88.

Figure 4:
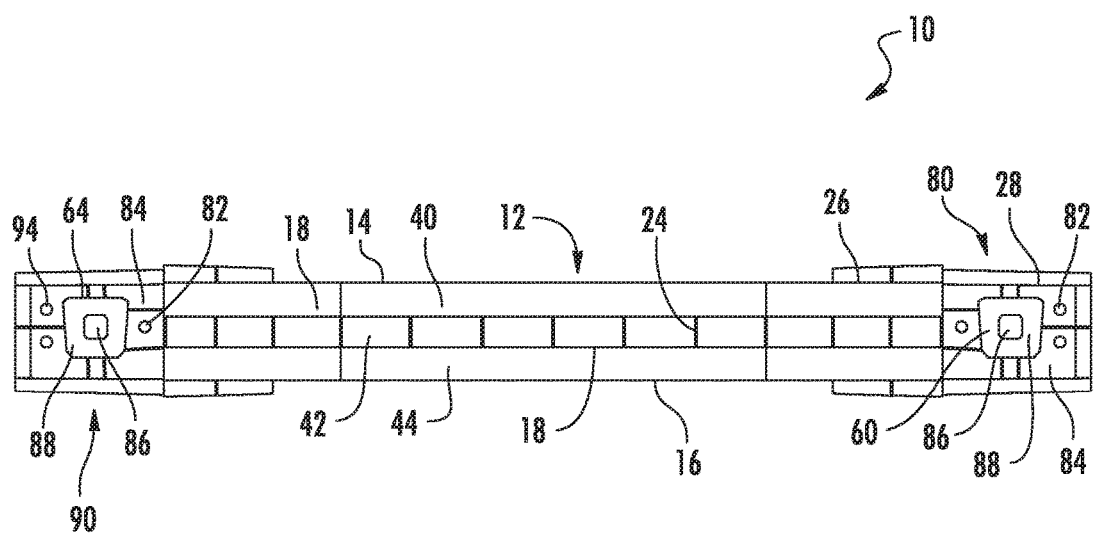
FIG. 4 illustrates a cross-sectional front view of the energy absorbing assembly.

FIG. 4 illustrates a cross-sectional front view of energy absorbing assembly 10. Beam 12 can have top wall 14, one or more mid walls 18 and bottom wall 16. Beam 12 can have one or more ribs 24. Beam 12 can have upper portion 40, middle portion 42 and bottom portion 44. Beam 12 can have rear horizontal flange 26 and front horizontal flange 28. Beam 12 can have first crash can 80 and second crash can 90. First crash can 80 can have first protrusion 60. First protrusion 60 can have one or more walls 88 and channel 86. Second crash can 90 can have second protrusion 64. Second protrusion 64 can have one or more walls 88 and channel 86. First crash can 80 can have attachment face 84. Second crash can 90 can have attachment face 84. Attachment face 84 can have one or more attachment holes 82.

Figure 5:
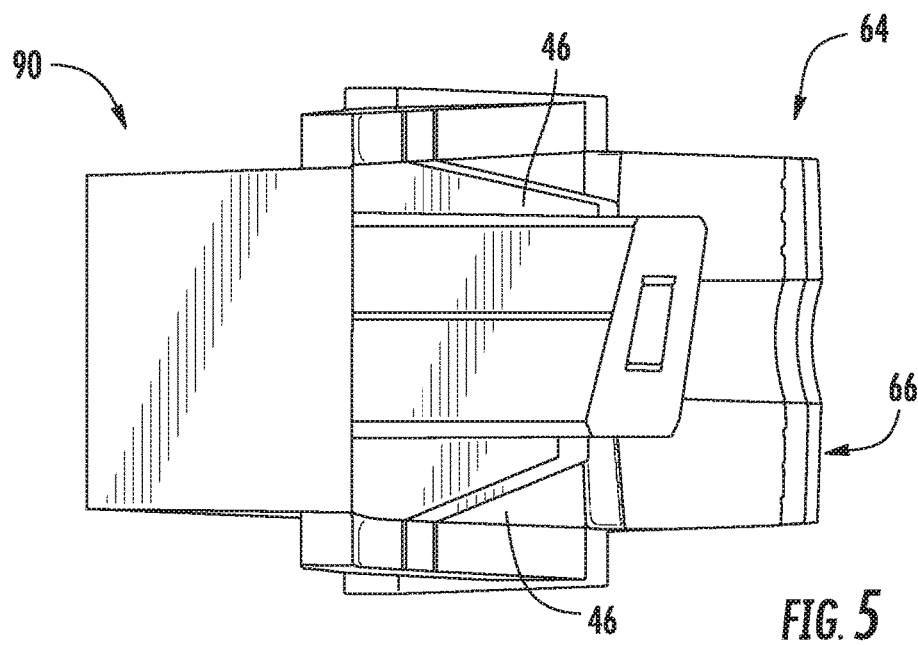
FIG. 5 illustrates a side view of a crash can.

FIG. 5 illustrates a side view of a crash can and protrusion. In FIG. 5, the viewer is looking at the side of second crash can 90 and second protrusion 64. Second crash can 90 and second protrusion 64 are connected through supporting ribs 46. Front surface 66 is shown.

Figure 6:
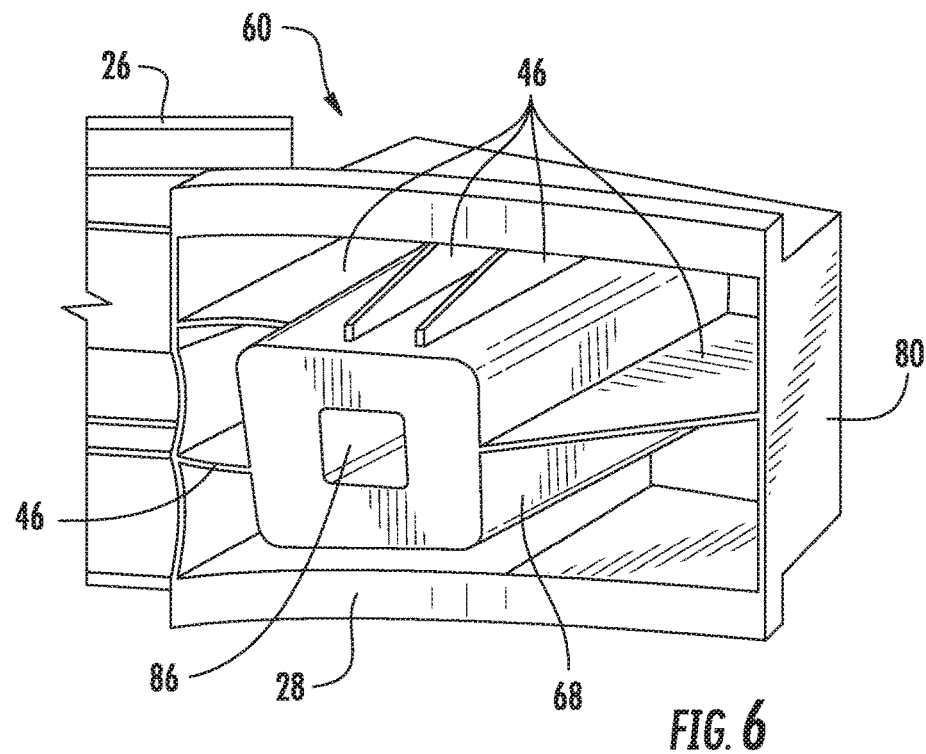
FIG. 6 illustrates a detailed front view of a crash can.

FIG. 6 illustrates a detailed front view of a protrusion and crash can. In FIG. 6, first crash can 80 is shown. First crash can 80 is attached to first protrusion 60 with one or more connecting ribs 46. Front horizontal flange 28 is shown. Rear horizontal flange 26 is shown. The honeycomb structure 92 with channels 86 (see FIG. 2), forms protrusion 68 on the opposite side of the assembly. As is illustrated, the protrusion 68 can comprise the channel 86, extending from the other side.

Figure 7:
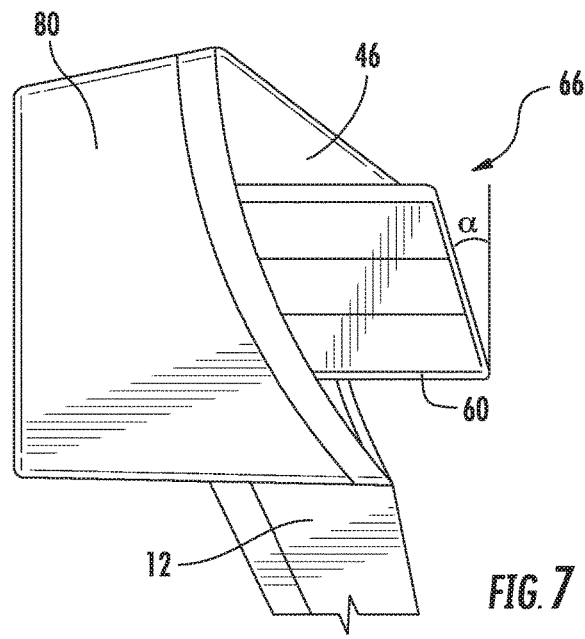
FIG. 7 illustrates a top view of a crash can.

FIG. 7 illustrates a top view of a protrusion and crash can. In FIG. 7, first crash can 80 is shown. First crash can 80 is attached to first protrusion 60 with connecting rib 48 (see FIG. 10). Beam 12 is shown attached to first crash can 80. Front surface 66 is shown. Extending from the front surface 66 can be supporting rib(s) 46.

The energy absorbing assembly can be manufactured by using an injection molding processes. Portions of the energy absorbing assembly can be manufactured separately then secured together, for example by physical engagement, by fastening means or by welding. The energy absorbing assembly can be manufactured as one piece.

The energy absorbing assembly can comprise vehicle attachment means for securing the assembly to the rails of a vehicle. For example, a small metallic piece can be welded on either end of the assembly to mount it over flat rail supports. Alternatively, the rail support can be rotated so that its flat surface is coplanar with the vertical surface of the energy absorbing assembly at either end. Any attachment means that will provide the desired attachment between the energy absorbing assembly and vehicle can be used (e.g., bolts, adhesive, etc.).

The energy absorbing assembly can be configured for attachment to a front end module and/or a rear end module. A front end and/or rear end module can include a multi-piece assembly. A front end or rear end module can integrate a large number of components into a single assembly. A front end module and/or rear end module can be supplied to a vehicle manufacturer as a sub-assembly that can then be installed onto a vehicle. A front end module and/or rear end module can include lighting assemblies and/or components, radiators, hoses, cooling fans, air conditioning components, a grille, grille-opening reinforcement panels, crumple zones, bumper beams, bumper assemblies, energy absorbing assemblies, decorative fascia, hood latches, washer bottles, electronics, wiring, and the like. The components of a front end or rear end module can vary by supplier tier level and by vehicle manufacturer. The use of front and/or rear end modules rather than piecemeal assembly can reduce assembly labor, assembly time, and/or assembly steps (processes) at a vehicle manufacturer's assembly line.

The structure of front end module and/or rear end module can be standardized and can allow common designs to be used across multiple models sold into multiple geographies. This can provide cost savings to a vehicle manufacturer. Front end modules and/or rear end modules can allow vehicle manufacturers a global vehicle platform while allowing for model variation (or versions) that can differ between localities (e.g. geographically).

A fascia can surround the energy absorbing assembly such that the assembly will not be visible once attached to the vehicle. The fascia can be formed from a thermoplastic material and can undergo a finishing process utilizing conventional vehicle painting and/or coating techniques.

When attached to a vehicle, the energy absorbing assembly can be attached to the vehicle rails via the attachment face. The energy absorbing assembly is located between the fascia and the vehicle rails. With this design, no additional bumper beam is needed. In other words, the vehicle can be free of a metal bumper beam. The energy absorbing assembly can attach directly to the fascia and to the vehicle rails.

An energy absorbing assembly can absorb impact energy at low and/or moderate speeds. It can be used for vehicles to minimize the damage to the vehicles and/or pedestrians during low-speed and/or moderate-speed impacts. The energy absorbing assembly is designed to start crushing upon an impact force of greater than or equal to 5 kiloNewtons (kN). In other words, in some embodiments, the energy absorbing assembly can start crushing when impacted with a force of 5 kN. In another embodiment, the energy absorbing assembly can starts crushing when impacted with a force of 10 kN. In yet another embodiment, the energy absorbing assembly can starts crushing when impacted with a force of 20 kN. In yet another embodiment, the energy absorbing assembly can starts crushing when impacted with a force of 60 kN.

The energy absorbing assembly is further illustrated by the following non-limiting examples.

EXAMPLES

Figure 8:
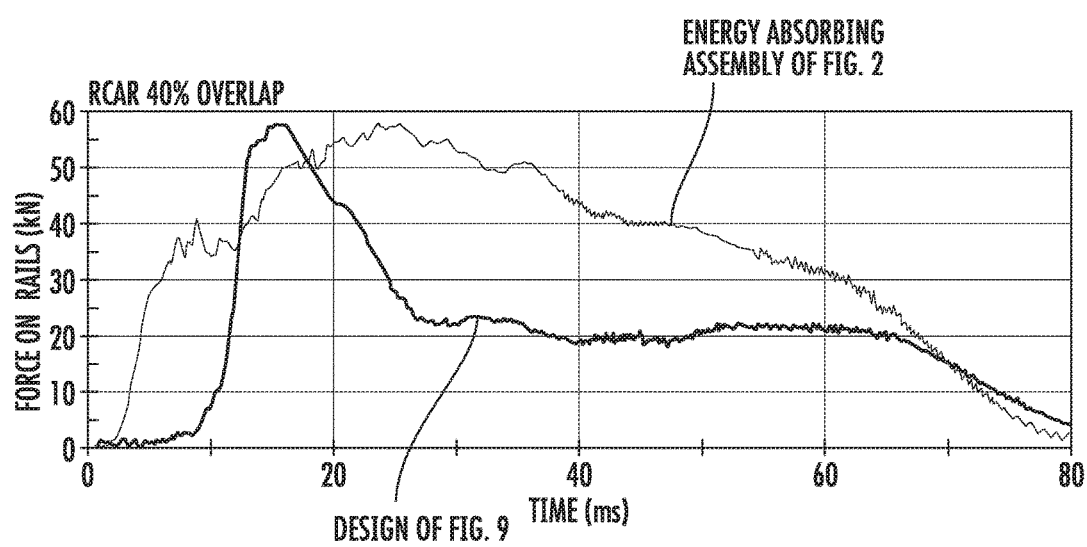
FIG. 8 illustrates comparative data for energy absorption efficiency for a conventional energy absorption system and the described energy absorbing assembly for the RCAR 40% overlap test.
Figure 9:
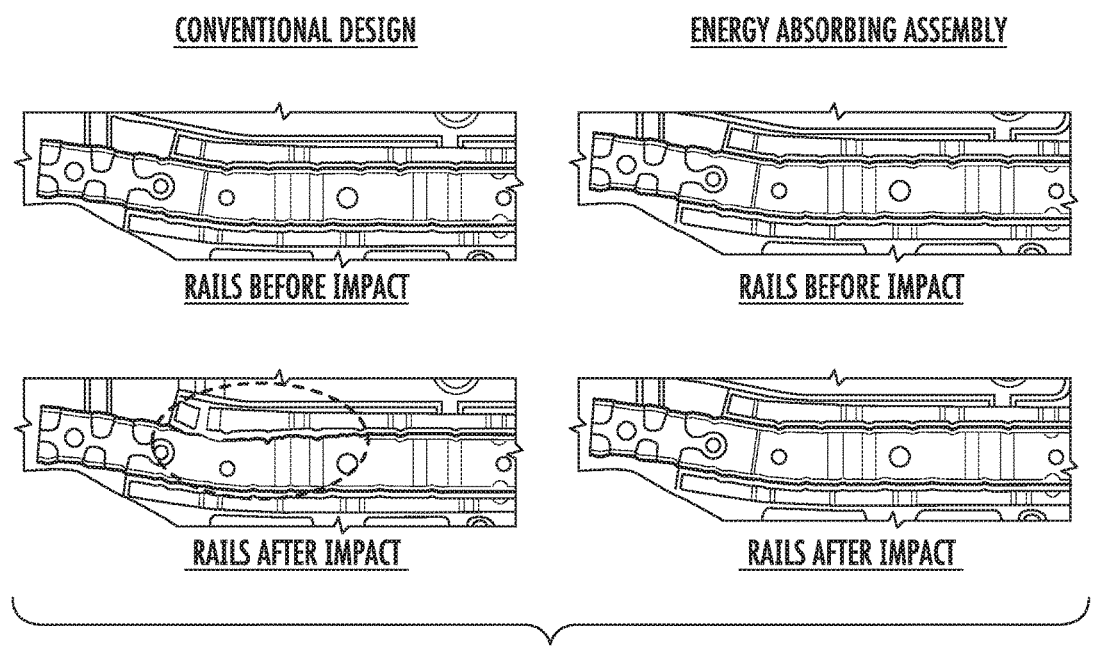
FIG. 9 illustrates the deformation pattern of vehicle rails using a prior energy absorption system and the presently described energy absorbing assembly for the RCAR 40% overlap test.
Figure 11:
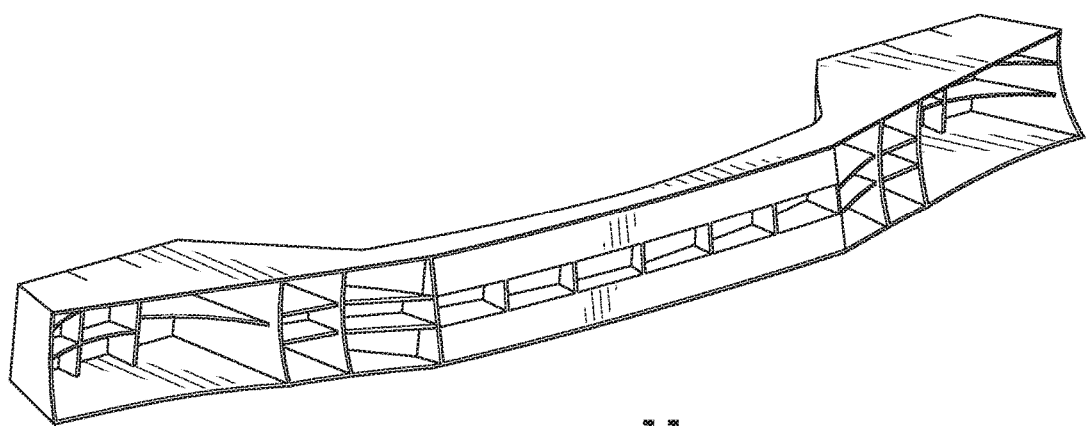
FIG. 11 illustrates a rear perspective view of the energy absorbing assembly without protrusions in the crash cans.

Comparative studies were conducted to compare a beam without crash cans having protrusions extending from the attachment face (see FIG. 11) and an energy absorbing assembly including the features described here (see FIG. 2). The protrusion extends by approximately 200 mm from the base (i.e., the attachment face). The RCAR 10 degree 40% overlap 15 km/hour impact test was performed. A graph of energy absorption efficiency is shown in FIG. 8. The area under the force on rails (in kiloNewtons (kN)) v. time (in milliseconds (ms)) curve shows the efficiency of energy absorption. The maximum value of force is limited to 60 kN, beyond which the vehicle rail cannot withstand the load and starts undergoing permanent deformation. During the test, the rear floor was deformed when a conventional beam was used. Using the energy absorbing assembly described here, the rear floor was not deformed. FIG. 9 shows the deformation pattern of the vehicle rails before impact and after impact for the RCAR 40% overlap test. It is seen that when a conventional beam is used, the vehicle rails undergo a permanent deformation. The vehicle rails are not deformed with the energy absorbing assembly described here is used.

The energy absorbing assembly and methods of making include at least the following embodiments:

Embodiment 1

An energy absorbing assembly for attachment to a vehicle, comprising: a beam comprising a first end portion and a second end portion, wherein the beam optionally comprises a curved portion contiguous with and oriented between the first end portion and the second end portion, the optional curved portion being arced in a direction orthogonal to a lengthwise direction of the beam, wherein the curved portion comprises a front side and a back side; a first crash can extending from the first end portion of the beam, the first crash can including cavity formed by sides extending from a first attachment face, with a first protrusion projecting forward from the attachment face toward the front side of the beam, and the first crash can extending behind the back side of the beam at the first end portion; a second crash can extending from the second end portion of the beam, the second crash can including cavity formed by sides extending from a second attachment face, with a second protrusion projecting forward from the front side of the beam, and the second crash can extending behind the back side of the beam at the second end portion; wherein the first protrusion extend from the first attachment face by an amount that is greater than or equal to 110% of a distance that the first sides extend from the first attachment face; and wherein the second protrusion extend from the second attachment face by an amount that is greater than or equal to 110% of a distance that the second sides extend from the second attachment face.

Embodiment 2

The energy absorbing assembly of Embodiment 1, wherein the beam is integral with the first crash can and second crash can.

Embodiment 3

The energy absorbing assembly of any of the preceding Embodiments, wherein the first protrusion is integral with the first crash can and the second protrusion is integral with the second crash can.

Embodiment 4

The energy absorbing assembly of any of the preceding Embodiments, wherein the energy absorbing assembly is a single element.

Embodiment 5

The energy absorbing assembly of Embodiments 1-2, wherein the first protrusion is not an integral with the first crash can and the second protrusion is not an integral with the second crash can, and these protrusions and are assembled separately to the energy absorbing assembly using secondary joining methods such as friction welding or ultrasonic welding or structural adhesives, or mechanical fasteners etc.

Embodiment 6

The energy absorbing assembly of Embodiments 1-2, wherein the first protrusion is formed separately from the first crash can and the second protrusion is formed separately from the second crash can.

Embodiment 7

The energy absorbing assembly of Embodiment 6, wherein the first protrusion and the second protrusion attached to the first crash can and the second crash can, respectively, using a secondary joining method.

Embodiment 8

The energy absorbing assembly of Embodiment 7, wherein the secondary joining method comprises at least one of friction welding, ultrasonic welding, structural adhesives, and mechanical fasteners, for example, comprises at least one of friction welding and ultrasonic welding.

Embodiment 9

The energy absorbing assembly of any of the preceding Embodiments, wherein the first crash can and the second crash can each include an attachment portion for facilitating a fixed connection of the assembly to a vehicle body, the attachment portion comprising an attachment face and an attachment hole.

Embodiment 10

The energy absorbing assembly of Embodiment 9, wherein each attachment portion aligns with a vehicle rail.

Embodiment 11

The energy absorbing assembly of any of the preceding Embodiments, wherein the first protrusion is attached to the first crash can with a connecting rib and the second protrusion is attached to the second crash can with a connecting rib.

Embodiment 12

The energy absorbing assembly of any of the preceding Embodiments, wherein the first protrusion and second protrusion each have a front surface that forms an angle that matches the angle of a testing device.

Embodiment 13

The energy absorbing assembly of Embodiment 12, wherein the front surface matches the radius of the RCAR 10 degree 40% overlap bumper barrier testing device.

Embodiment 14

The energy absorbing assembly of any of the preceding Embodiments, wherein the energy absorbing assembly comprises a thermoplastic material.

Embodiment 15

The energy absorbing assembly of any of the preceding Embodiments, wherein the energy absorbing assembly is injection molded.

Embodiment 16

The energy absorbing assembly of any of the preceding Embodiments, wherein the curved portion has a center portion that has a smaller curve angle than the curve angle at the first end and the second end.

Embodiment 17

The energy absorbing assembly of any of the preceding Embodiments, wherein the center portion has an angle that matches the angle of a testing device.

Embodiment 18

The energy absorbing assembly of Embodiment 17, wherein the center portion has an angle that matches the angle of the ECE R 42 pendulum impact testing device.

Embodiment 19

The energy absorbing assembly of any of the preceding Embodiments, wherein the front surface of the first protrusion and the front surface of the second protrusion do not extend past the front side at the center portion of the beam.

Embodiment 20

The energy absorbing assembly of any of the preceding Embodiments, wherein the first crash can and second crash can each comprise a honeycomb structure.

Embodiment 21

The energy absorbing assembly of any of the preceding Embodiments, wherein the first protrusion and second protrusion comprise four walls surrounding an opening.

Embodiment 22

The energy absorbing assembly of any of the preceding Embodiments, wherein the first protrusion is connected to the end of the first crash can with a first supporting rib and second protrusion is connected to the end of the second crash can with a second supporting rib.

Embodiment 23

The energy absorbing assembly of any of the preceding Embodiments, wherein the beam comprises an upper portion, a middle portion, and a bottom portion, wherein the middle portion comprises a solid surface at the back side of the beam and the upper portion and bottom portion comprise a solid surface at the front side of the beam, and wherein there is more than one rib connecting the upper portion and middle portion, and more than one rib connecting the middle portion and bottom portion.

Embodiment 24

The energy absorbing assembly of any of the preceding Embodiments, wherein the first protrusions extend from the first attachment face by the amount that is greater than or equal to 125% of a distance that the first sides extend from the first attachment face; and/or wherein the second protrusions extend from the second attachment face by the amount of greater than or equal to 125% of a distance that the second sides extend from the second attachment face.

Embodiment 25

The energy absorbing assembly of any of the preceding Embodiments, wherein the first protrusions extend from the first attachment face by the amount of greater than or equal to 150% of a distance that the first sides extend from the first attachment face; and/or wherein the second protrusions extend from the second attachment face by the amount of greater than or equal to 150% of a distance that the second sides extend from the second attachment face.

Embodiment 26

The energy absorbing assembly of any of the preceding Embodiments, wherein the first protrusions extend from the first attachment face by the amount of greater than or equal to 165% of a distance that the first sides extend from the first attachment face; and/or wherein the second protrusions extend from the second attachment face by the amount of greater than or equal to 165% of a distance that the second sides extend from the second attachment face.

Embodiment 27

A method of making the energy absorbing assembly of any of the preceding Embodiments, comprising: introducing molten thermoplastic material to a mold to in situ form the energy absorbing assembly comprising a beam comprising a first end and a second end, wherein the beam further comprises a curved portion contiguous with and oriented between the first end and the second end, the curved portion being arced in a direction orthogonal to a lengthwise direction of the beam, wherein the curved portion comprises a front side and a back side; a first crash can extending from the first end of the beam, the first crash can including a first protrusion projecting forward from the front side of the beam at the first end, and the first crash can extending behind the back side of the beam at the first end; a second crash can extending from the second end of the beam, the second crash can including a second protrusion projecting forward from the front side of the beam at the second end, and the second crash can extending behind the back side of the beam at the second end; and removing the energy absorbing assembly from the mold.

Embodiment 28

The energy absorbing assembly of any of the preceding Embodiments, consisting of a polymer and optionally comprising attachment holes through the attachment face with metal grommets disposed in the attachment holes.

Embodiment 29

The energy absorbing assembly of any of the preceding Embodiments, comprising the curved portion.

Embodiment 30

A method of making an energy absorbing assembly, comprising: introducing molten thermoplastic material to a mold to in situ form the energy absorbing assembly comprising a beam comprising a first end and a second end, wherein the beam further comprises a curved portion contiguous with and oriented between the first end and the second end, the curved portion being arced in a direction orthogonal to a lengthwise direction of the beam, wherein the curved portion comprises a front side and a back side; a first crash can extending from the first end of the beam, the first crash can including a first protrusion projecting forward from the front side of the beam at the first end, and the first crash can extending behind the back side of the beam at the first end; a second crash can extending from the second end of the beam, the second crash can including a second protrusion projecting forward from the front side of the beam at the second end, and the second crash can extending behind the back side of the beam at the second end; wherein the first protrusions extend from the first attachment face by an amount that is greater than or equal to 110% of a distance that the first sides extend from the first attachment face; and wherein the second protrusions extend from the second attachment face by an amount that is greater than or equal to 110% of a distance that the second sides extend from the second attachment face; and removing the energy absorbing assembly from the mold.

This written description uses examples to disclose the invention, including the best mode, and also to enable any person skilled in the art to make and use the invention. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal language of the claims.

All ranges disclosed herein are inclusive of the endpoints, and the endpoints are independently combinable with each other. "Combination" is inclusive of blends, mixtures, and the like. Furthermore, the terms "first," "second," and the like, herein do not denote any order, quantity, or importance, but rather are used to distinguish one element from another. The terms "a" and "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term. Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. It is to be understood that the described elements may be combined in any suitable manner in the various embodiments and examples.

In general, the invention may alternately comprise, consist of, or consist essentially of, any appropriate components herein disclosed. The invention may additionally, or alternatively, be formulated so as to be devoid, or substantially free, of any components used in the prior art structures or that are otherwise not necessary to the achievement of the function and/or objectives of the present invention.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the appended claims.

What is claimed is:

1. An energy absorbing assembly for attachment to a vehicle, comprising:
   a beam comprising a first end portion and a second end portion;
   a first crash can extending from the first end portion of the beam, the first crash can including cavity formed by first sides extending from a first attachment face, with a first protrusion projecting forward from the first attachment face toward the front side of the beam, and the first crash can extending behind the back side of the beam at the first end portion;
   a second crash can extending from the second end portion of the beam, the second crash can including cavity formed by second sides extending from a second attachment face, with a second protrusion projecting forward from the front side of the beam, and the second crash can extending behind the back side of the beam at the second end portion;
   wherein the first protrusion extends from the first attachment face by an amount that is greater than or equal to 110% of a distance that the first sides extend from the first attachment face; and
   wherein the second protrusion extends from the second attachment face by an amount that is greater than or equal to 110% of a distance that the second sides extend from the second attachment face.

2. The energy absorbing assembly of claim 1, wherein the beam is integral with the first crash can and second crash can.

3. The energy absorbing assembly of claim 1, wherein the first protrusion is integral with the first crash can and the second protrusion is integral with the second crash can.

4. The energy absorbing assembly of claim 1, wherein the energy absorbing assembly is a single element.

5. The energy absorbing assembly of claim 1, wherein the first protrusion is formed separately from the first crash can and the second protrusion is formed separately from the second crash can.

6. The energy absorbing assembly of claim 5, wherein the first protrusion and the second protrusion attached to the first crash can and the second crash can, respectively, using a secondary joining method.

7. The energy absorbing assembly of claim 1, wherein the first crash can and the second crash can each include an attachment portion for facilitating a fixed connection of the energy absorbing assembly to a vehicle body, the attachment portion comprising first attachment face and second attachment face and an attachment hole.

8. The energy absorbing assembly of claim 7, wherein each attachment portion aligns with a vehicle rail.

9. The energy absorbing assembly of claim 1, wherein the first crash can and second crash can each comprise a honeycomb structure.

10. The energy absorbing assembly of claim 1, wherein the first protrusion is attached to the first crash can with a connecting rib and the second protrusion is attached to the second crash can with a connecting rib.

11. The energy absorbing assembly of claim 1, wherein the first protrusion and second protrusion each have a front surface that forms an angle that matches the angle of a testing device.

12. The energy absorbing assembly of claim 11, wherein the front surface matches the radius of the RCAR 10 degree 40% overlap bumper barrier testing device.

13. The energy absorbing assembly of claim 1, wherein the beam comprises a curved portion contiguous with and oriented between the first end portion and the second end portion, the curved portion being arced in a direction orthogonal to a lengthwise direction of the beam, wherein the curved portion comprises a front side and a back side, and wherein the curved portion has a center portion that has a smaller curve angle than the curve angle at the first end portion and the second end portion.

14. The energy absorbing assembly of claim 13, wherein the center portion has an angle that matches the angle of a testing device.

15. The energy absorbing assembly of claim 1, wherein the front surface of the first protrusion and the front surface of the second protrusion do not extend past the front side at the center of the beam.

16. The energy absorbing assembly of claim 1, wherein the first protrusion and second protrusion comprise four walls surrounding an opening.

17. The energy absorbing assembly of claim 1, wherein the first protrusion is connected to the end of the first crash can with a first connecting rib and second protrusion is connected to the end of the second crash can with a second connecting rib.

18. The energy absorbing assembly of claim 1, wherein the beam comprises an upper portion, a middle portion, and a bottom portion, wherein the middle portion comprises a solid surface at the back side of the beam and the upper portion and bottom portion comprise a solid surface at the front side of the beam, and wherein there is more than one rib connecting the upper portion and middle portion, and more than one rib connecting the middle portion and bottom portion.

19. The energy absorbing assembly of claim 1, consisting of a polymer and optionally comprising attachment holes through the first attachment face and second attachment face with metal grommets disposed in the attachment holes.

20. A method of making an energy absorbing assembly, comprising:
   introducing molten thermoplastic material to a mold to in situ form the energy absorbing assembly comprising a beam comprising a first end and a second end, wherein the beam further comprises a curved portion contiguous with and oriented between the first end and the second end, the curved portion being arced in a direction orthogonal to a lengthwise direction of the beam, wherein the curved portion comprises a front side and a back side;

a first crash can extending from the first end of the beam, the first crash can including a first protrusion projecting forward from the front side of the beam at the first end, and the first crash can extending behind the back side of the beam at the first end; a second crash can extending from the second end of the beam, the second crash can including a second protrusion projecting forward from the front side of the beam at the second end, and the second crash can extending behind the back side of the beam at the second end; wherein the first protrusions extend from the first attachment face by an amount that is greater than or equal to 110% of a distance that the first sides extend from the first attachment face; and wherein the second protrusions extend from the second attachment face by an amount that is greater than or equal to 110% of a distance that the second sides extend from the second attachment face; and removing the energy absorbing assembly from the mold.

* * * * *